United States Patent [19]

Jones

[11] 4,274,589
[45] Jun. 23, 1981

[54] SPRAYING APPARATUS EMPLOYING A SKIRT STRUCTURE

[75] Inventor: Derek Jones, Hamilton, Canada

[73] Assignee: A.C. Sprayers Inc., Hamilton, Canada

[21] Appl. No.: 959,723

[22] Filed: Nov. 13, 1978

Related U.S. Application Data

[63] Continuation-in-part of Ser. No. 820,110, Jul. 29, 1977, abandoned.

[51] Int. Cl.³ .......................... B05B 7/00; B60V 1/16
[52] U.S. Cl. ...................................... 239/167; 47/1.7;
 134/183; 239/172; 239/176; 239/288.5
[58] Field of Search .................... 118/305; 137/344;
 134/154, 167 R, 168 R, 182, 183, 201;
 180/116–130; 47/1, 7; 239/159, 163–169, 172,
 175, 176, 212, 273, 275, 279, 286–288.5

[56] References Cited

U.S. PATENT DOCUMENTS

| 2,977,715 | 4/1961 | Lindsay | 47/1.7 |
|---|---|---|---|
| 3,117,725 | 1/1964 | Palmer | 239/169 X |
| 3,341,125 | 9/1967 | Sweeney et al. | 180/117 X |
| 3,353,617 | 11/1967 | Hopkins | 180/127 |
| 3,439,875 | 4/1969 | Randall et al. | 180/128 X |
| 3,512,714 | 5/1970 | Phelps et al. | 239/168 |
| 3,561,558 | 2/1971 | Parkhouse | 180/127 X |
| 3,666,178 | 5/1972 | Crimmins et al. | 239/172 X |
| 3,804,332 | 4/1974 | Welch | 239/168 X |
| 3,908,784 | 9/1975 | Blurton et al. | 180/116 X |

FOREIGN PATENT DOCUMENTS 1338472 11/1973 United Kingdom ................ 180/117

Primary Examiner—Andres Kashnikow
Attorney, Agent, or Firm—Stanley J. Rogers

[57] ABSTRACT

In a new spraying apparatus a spray boom structure supporting the spray dispensers for liquid or finely divided spray material is supported by an air pressured flexible bag skirt attached to the structure and forming an enclosure into which the spray dispensers discharge to minimize drift of the sprayed material and permitting increased speed of the apparatus over the ground. The bag skirt structure also "averages out" irregularities in the surface so that a more uniform spray pattern is achieved. Air is fed into the enclosure from the leading bag skirt part via an elongated aperture close to the ground and from the trailing bag skirt part from an elongated aperture close to the enclosure roof. The weight of the fan and its housing supplying the pressurized air is supported separately from the boom. The boom structure may comprise hinged portions that can be moved to a vertical storage position, and it may also include arcuate downwardly extending support members. The bag skirt structure is supported from the frame consisting of parallel rods and cross-members by loops of material through which the rods pass.

15 Claims, 9 Drawing Figures

SPRAYING APPARATUS EMPLOYING A SKIRT STRUCTURE

CROSS REFERENCE TO RELATED APPLICATIONS

This application is a continuation-in-part of my prior application Ser. No. 820,110 filed July, 29, 1977, and now abandoned.

FIELD OF THE INVENTION

The present invention is concerned with improvements in or relating to spraying apparatus, and especially to such apparatus employing an air-supported skirt structure.

Review of the Prior Art

Repeated carefully controlled spraying is now an essential part of any agricultural operation. With increases in the toxicity and cost of spray materials it becomes more and more essential to achieve uniform application and to avoid unwanted drift of the finely divided material. Thus, insufficient or too great application is of course wasteful of the material itself, but with many modern spray materials excessive application can even damage the crop plant. Again many modern materials are sufficiently hazardous that the operators must wear special protective clothing and take special handling precautions. Many authorities now have enforced regulations as to weather conditions in which spraying can take place; for example with some materials the Province of Ontario, Canada, will not permit spraying if the wind speed is higher than 7 m.p.h. (11 k.p.h.) while with some chemicals it is considered imprudent to operate if the wind speeds are higher than 4 m.p.h. (6.4 k.p.h.).

One particular form of skirt structure employed hitherto consists of a peripheral air bag or bags which are inflated by the pressurised air. One of the problems encountered with any type of air-supported vehicle hitherto is the relatively high cost of the air-enclosing skirt, and it is a constant endeavour to provide as inexpensive a construction as possible.

DEFINITION OF THE INVENTION

It is an object of the invention to provide a new spraying apparatus providing for substantially complete enclosure of the spraying zone.

It is a further object to provide a new spraying apparatus in which the sprayer boom is supported from the ground by an air bag skirt enclosing the spraying zone.

In accordance with the present invention there is provided spraying apparatus employing a skirt structure comprising a sprayer boom frame, a bag skirt structure carried by the frame and when inflated extending downwards therefrom to have its smoothly contoured convex lowermost portion in close proximity to the ground, the bag skirt structure forming an enclosure which is open to the ground, means for injecting air under pressure into the bag skirt and into the skirt enclosure whereby the bag skirt is inflated and the boom and the skirt structure will be supported above the ground and can be moved over the ground, and dispensing means mounted by the boom to deliver spray material to the skirt interior.

Preferably the bag skirt structure comprises two spaced parallel air-receiving passages constituting respective parts of an air bag or bags, and an end closure member comprising an envelope disposed over the adjacent ends of the said spaced parallel passages and overlapping said ends, wherein the air received in the passages expands the respective portions of the passages within the envelope into sealing engagement with the envelope. Such a bag skirt construction preferably includes fastening means fastening a portion of the said passages to a portion of the envelope to retain the envelope thereon.

DESCRIPTION OF THE DRAWINGS

A spray apparatus employing an air bag structure which is a particular preferred embodiment of the invention will now be described by way of example, with reference to the accompanying diagrammatic drawings wherein:

FIG. 8 is an exploded view of the end of the bag skirt; and

FIG. 9 is a cross-section on the line 9—9 of FIG. 2.

DESCRIPTION OF THE PREFERRED EMBODIMENTS

Figure 1:
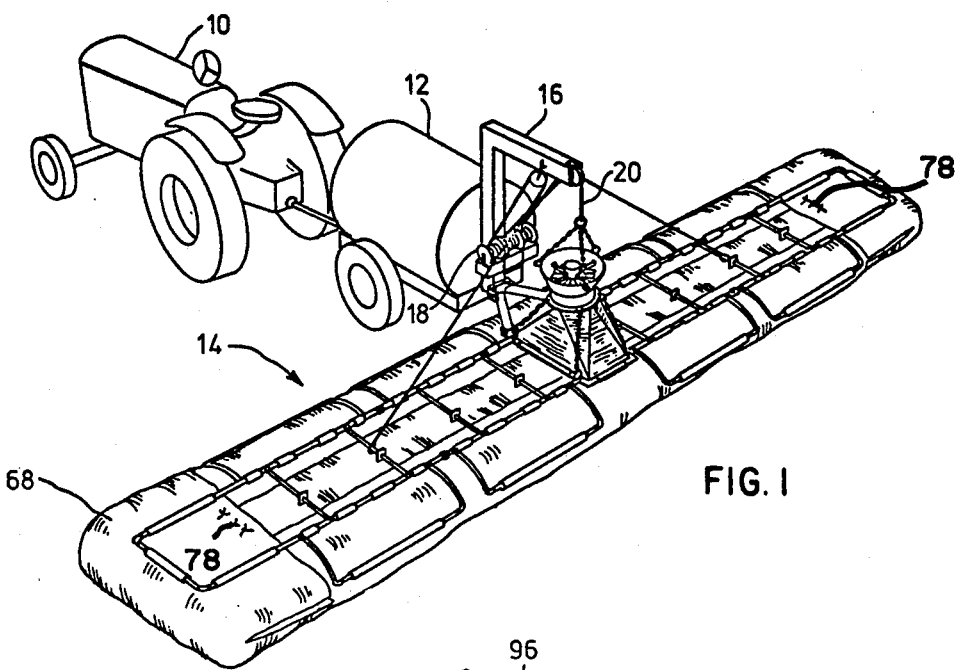
FIG. 1 is a general perspective view showing the spray apparatus together with a liquid supply tank and tractor therefor.
Figure 7:
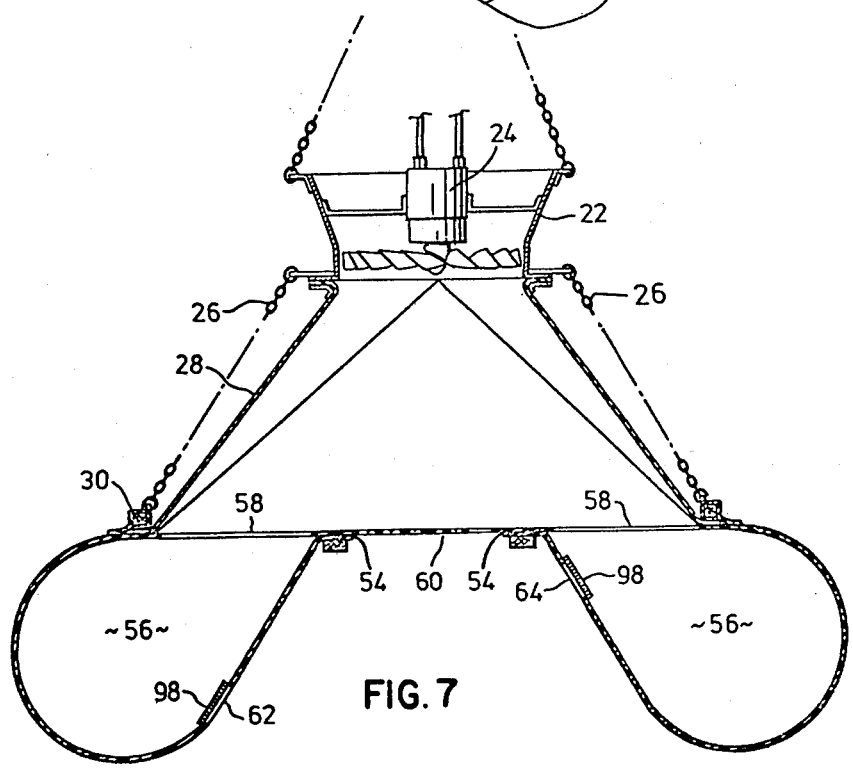
FIG. 7 is a cross-section taken on line 7—7 of FIG. 2.

A complete agricultural sprayer consists of a tractor 10 (FIG. 1) pulling a liquid supply tank 12, which in turn tows behind it the spray apparatus 14. In other embodiments the liquid supply tank can be mounted on the tractor which tows the apparatus 14 directly via the usual three point hitch. More particularly the tank 12 is provided at its rear end with a small hoist derrick 16 on which is mounted a winch 18. The winch cable 20 is fastened by chains to the top of a circular fan housing 22 mounting a fan 24. In this embodiment the fan housing is connected by support chains 26 (FIGS. 7 and 9) and a flexible tubular plenum member 28 to a rectangular metal frame member 30. The fan 24 is driven, as is also the winch 18, by power supplied in any well known manner from the tractor. It will be apparent that the weight of the spray apparatus 14 is thereby minimized, as many as possible of the parts of the complete sprayer being carried by the tractor 10 and/or the tank 12.

Figure 3:
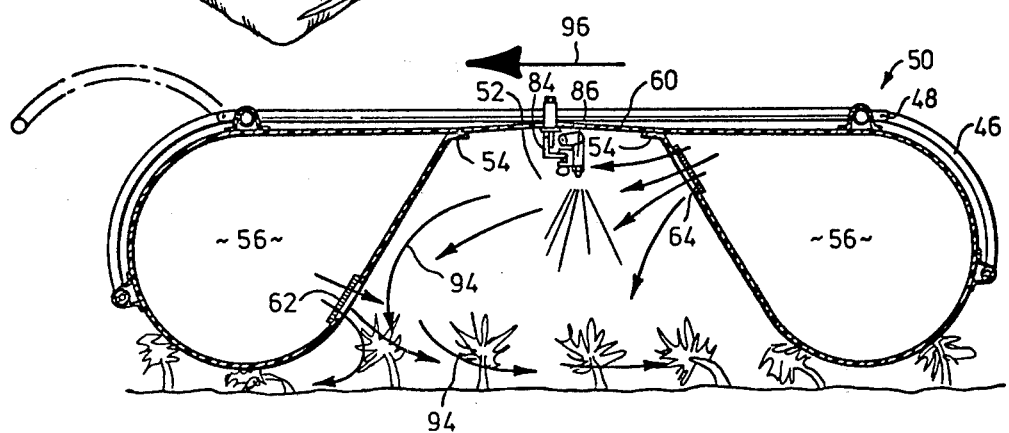
FIG. 3 is a plane cross-section on the line 3—3 of FIG. 2.
Figure 2:
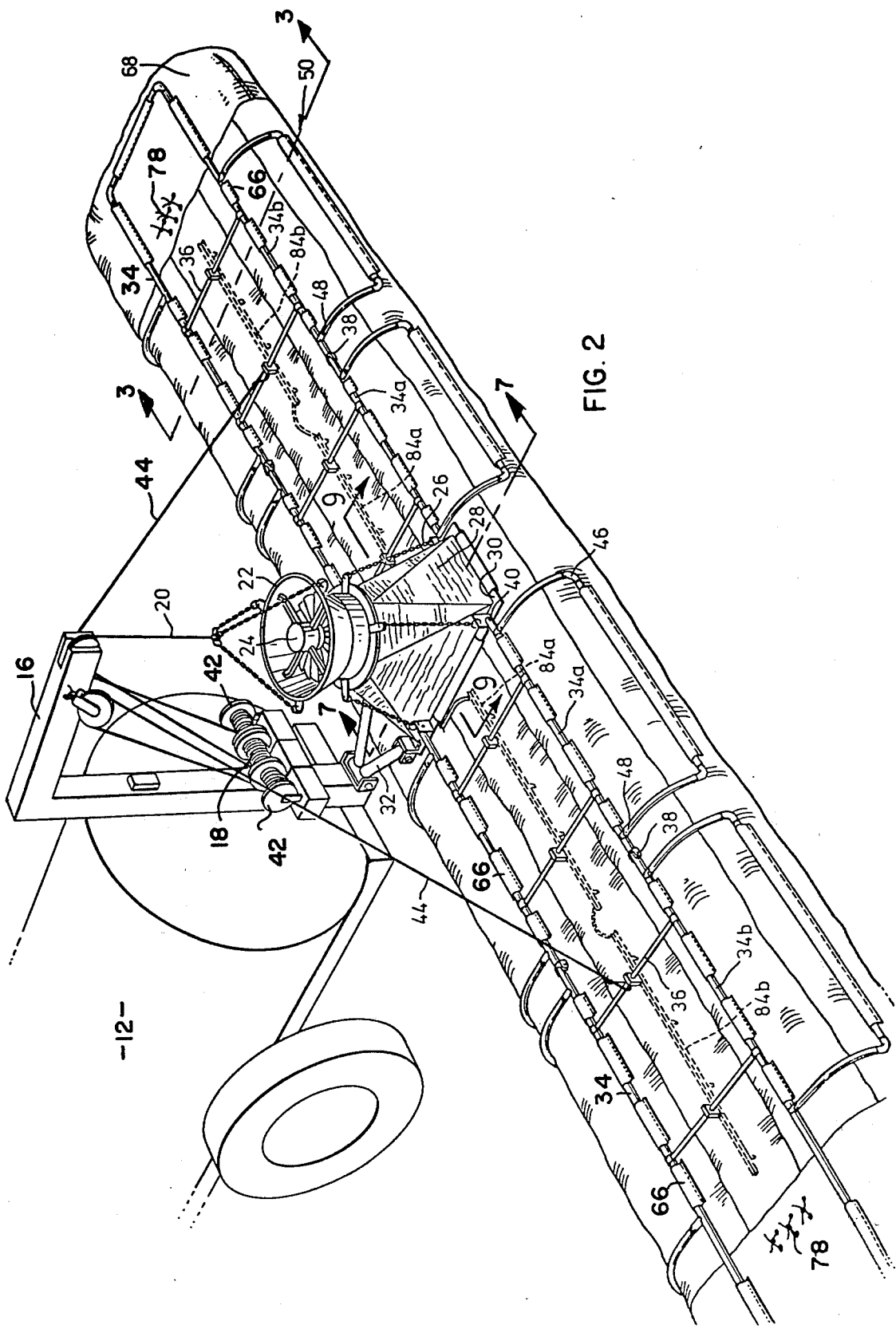
FIG. 2 is a similar view to a larger scale showing the spray apparatus and a part only of the liquid supply tank.
Figure 4:
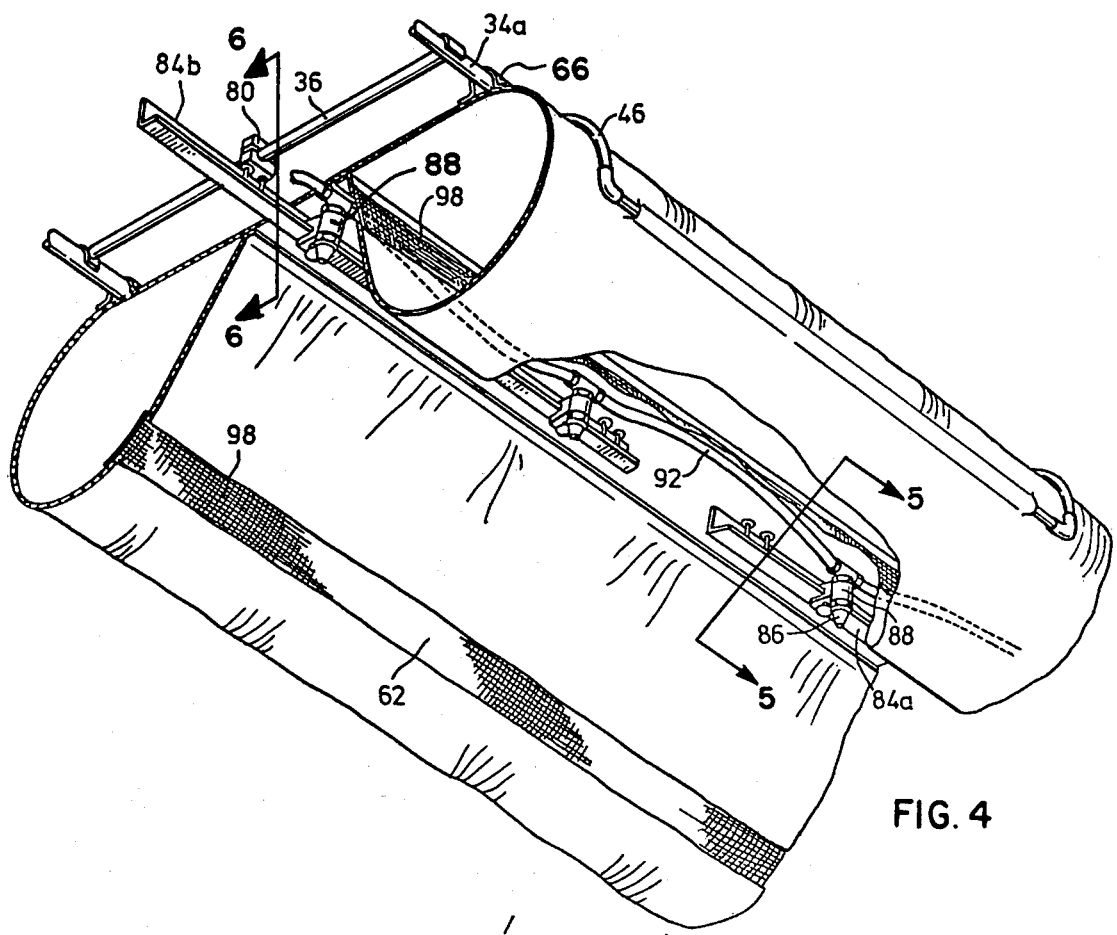
FIG. 4 is a perspective view from below of part of the spray apparatus with part of one of the skirt bags shown broken away to reveal the spray nozzles.

The housing frame member 30 is pivotally connected by rigid draw struts 32 (FIG. 2) to the rear end of the tank 12 and serves as the convenient anchor point for two oppositely-extending spray boom frames, each of which consists of two spaced parallel rods 34 connected together by spaced parallel cross-members 36. In this embodiment each rod 34 is divided about mid-way of its length into two sections 34a and 34b pivotally hinged to one another at 38, while the inboard rod sections 34a are pivotally hinged at 40 to the frame member 30, so that for storage and transport each boom can be folded with the sections 34a extending upwards and the sections 34b extending downwards close and parallel to the sections 34a. This lifting into the storage and transport position is effected by means of respective winches 42 mounted on the hoist 16 and connected by cables 44 to a respective cross member 36. It will be appreciated that in other embodiments the rods may be divided into more than two sections suitably pivoted to one another. The hinges at 38 permit the above-described folding, and sufficient upward hinging for the boom to be able to follow the ground directly underneath it. The hinges at 40 must of course permit ninety degree movement of the booms upward, together with a smaller but sufficient downward movement. The spray boom frames are completed by arcuate front and back downward-extending sections 46 hinged at 48 to the rods 34 to permit upward movement for storage, as illustrated by FIG. 3.

The spray boom frames hold a peripheral flexible bag skirt structure 50 in extension, and are in turn supported by the skirt structure from the ground under the effect of the air that is injected under pressure by the fan 24 into an enclosure 52 formed by the skirt. In this particular embodiment the bag skirt is formed from an elongated strip of suitable material, e.g. heavy polyvinyl sheet, by folding the edge portions of the sheet toward its centre and fastening them to the centre part of the body along spaced parallel lines, as at 54 in FIGS. 3 and 7. As best seen in FIGS. 3, 4, 7 and 8 there are thus formed two elongated, parallel enclosed passages 56 each of which is supplied with air from the fan via respective openings 58 (FIG. 7) in the floor of the frame 30. The passages are physically connected by the centre portion 60 of the elongated strip constituting a roof for the spray zone enclosure 52, this enclosure having the two air passages 56 as its respective longer side walls, and into which air is fed from the passages via apertures 62 and 64 in the passage inside walls. Such a skirt is commonly called a bag skirt in that it consists either of a single peripheral bag, or alternatively of a number of bags arranged around the periphery of the structure to be supported thereby. The bag skirt structure is connected to the rods 26a and 26b and frames 46 by loops 66 of the flexible skirt material through which the frame rods are threaded.

Since in this embodiment the bag skirt is required to enclose a spray zone constituted by the enclosure 52, it is desired that it be substantially continuous around the periphery of the enclosure, and difficulty has always been experienced hitherto in providing a relatively inexpensive method of forming the bag ends of a bag skirt. In accordance with this invention such end closures are provided by means of two open-sided envelopes 68 which are slipped over the respective ends of the above-described strip-formed passages. A rigid batten 70 is provided on the upper surface of the strip mounted within a sleeve 72, and is of sufficient length to hold the bags to the required shape at the respective locations. The central portion of the envelope lower edge carries a shorter rigid batten 74 on a sleeve 76, which is then lifted up into the enclosure until it touches the roof underside; the two battens 70 and 74 are then fastened together by lashings 78 (FIG. 2) passing through the roof around the battens. A substantial overlap is provided between each envelope and the adjacent portion of the strip and it is found that, as the passages 56 are inflated they expand inside the envelope and hold it sufficiently firmly to be retained without any substantial leakage during normal operating conditions.

Such an end closure avoids the need for relatively expensive seaming and joining operations between the passage-forming strip and the end-closing envelopes. It will be seen that the passage structure can readily be formed continuously, the desired length cut therefrom as required and the end closures applied. If the air-sealing between the passage structure and the end closures is not quite sufficient it can be improved by making the latter of just slightly smaller periphery than the former, so that they are forced into even more intimate contact by the internal air pressure.

Figure 5:
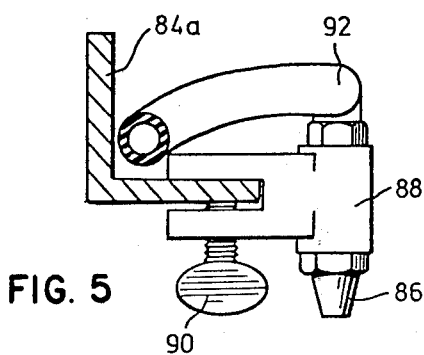
FIG. 5 is a plane section on the line 5—5 of FIG. 4 to show the manner of mounting a nozzle.
Figure 6:
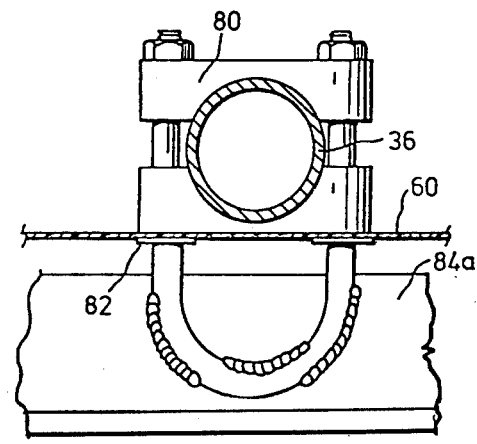
FIG. 6 is a plane section on the line 6—6 of FIG. 4 to show the manner of mounting a nozzle support.

As described above, each pair of parallel rods 34a and 34b is connected by cross-members 36, the ends of which are removably fastened to the respective rods, so that the boom can readily be disassembled for removal of the skirt. Each cross-member 36 has at its centre a downwardly-extending U-bolt clamp 80, the legs of which pass through apertures in the enclosure roof 60, flanges 82 being provided on the bolt legs against which the material is clamped to permit an air-tight seal to be maintained where the legs pass through the material. L-section spray nozzle support member sections 84a and 84b are fixed to the bights of the respective clamps, separate sections being used to permit the above-described folding for storage, etc. A plurality of spray-nozzles 86 are mounted on each support member 84 so as to be adjustable in position along its length, permitting the nozzles to be located as required relative to the rows of the crop to be sprayed. Thus each nozzle is fastened to a bracket 88 (FIG. 5) which embraces the lower horizontal leg of the support, and can be clamped thereto by a set screw 90. The nozzles are supplied with spray liquid or finely powdered material under pressure from the tank 12 via flexible connecting hoses 92 (not shown in FIGS. 1 & 2).

In operation, with the fan housing 22 suspended at a suitable height from the derrick 16, the fan 24 is started and the skirt air bags inflate, the air discharging into the enclosure 52 through the apertures 62 and 64, as indicated by the arrows 94 in FIG. 3. The arcuate downwardly-extending frame portions 46 support the sides of the inflated bags as the sprayer is moved forward or backward. Thus the weight of the spray apparatus 14 is supported by the pressurized air with the lower edge of the bag skirt structure sufficiently close to the surface over which it is passing to brush it, so that a minimum of the air escapes from the enclosure 52, minimizing both the power required to pressurize the air and the possibility of drift of air entrained material from the enclosure. The amount of air escaping will increase with increasing "porosity" of the surface to the outgoing air, due for example to the presence of a growing crop, as the boom pulled behind the tractor passes over the rows of crop being sprayed, but this escape is downward into the porous surface again minimizing sideways drift.

In this particular embodiment the pressurised air is fed first to the interior of the bag skirt structure and thereafter to the enclosure 52, but in other embodiments the bag skirt structure may be pressurised separately.

The direction of movement of the boom is indicated by the arrow 96 in FIG. 3, and it will be noted that the aperture 62 in the leading passage 56 is disposed relatively close to the ground, while the aperture 64 in the trailing passage 56 is located close to the enclosure roof 60. It will also be noted that the effect of the passage of the apparatus over the crop is to bend the plants in the direction of movement. The enclosure 52 provides a virtually wind-free volume into which the spray is directed, the major part constituted by the larger droplets discharging downwards, as with a conventional spray boom, so as to coat the uppermost surfaces of the crop and the ground directly below. A minor part constituted mainly by the smaller droplets will be entrained by the air streams from the apertures 62 and 64 to be deposited on the crop under surfaces. The forward aperture should also be the lower aperture to optimise this effect on the forward-bending crop. This effect ensures to a much greater extend than is possible with unenclosed sprays that the plants are fully and uniformly exposed to the spray material. Nevertheless, little or no spray material can escape from the enclosure.

The apertures 62 and 64 can consist of a large number of small closely-spaced holes, formed directly in the material of the bag skirt, but conveniently they are elongated slots, as illustrated, with the parallel edges connected by elongated strips 98 of mesh material through which the air can flow. With this particular structure the air is fed into the enclosure 52 uniformly from the front and rear air bags over the entire length of the boom, to reduce as much as possible undesired transverse movement of the air in the enclosure, such transverse movement causing distortion of the spray pattern.

It will be understood that the profile of a bag skirt structure must always be a smooth curve providing for smooth and progressive entry and exit of the crop to and from the skirt enclosure, minimizing damage to the crop over which it is passing. This must be contrasted with the effect that would be obtained with a vertical skirt, the lower edge of which would act as a form of scraper blade with its potential damage, particularly to a tender new crop. Furthermore, this shape in cooperation with the surface over which it passes constitutes a diffuser passage of progressively increasing area to the escaping air, so that the air discharge velocity drops abruptly immediately after passing through the narrowest part of the passage. The support of the apparatus boom in this manner ensures that the weight of each boom is uniformly distributed over a substantial area and there is no need for outrigger wheels, with their possibility of damage. The winch 18 can be adjusted at any time to adjust the height of the fan housing 22 above the ground. The use of an air-supported structure is found to result in an "averaging" effect upon the height of the spray dispensing nozzles above the ground, and this is believed to be of importance in achieving an improved consistent spraying effect. Thus, in conventional wheeled apparatus adjacent wheels may be down in rut, hole or furrow and on top of a mound or hillock, so that the height of the respective nozzles is very different. Again the too-fast travel of prior art apparatus over rough ground causes whipping movement of the boom, both vertically and laterally, destroying the uniformity of the spray pattern. With the apparatus of the invention such changes in ground contour are averaged over the length of the boom to a much more constant value and boom whipping is eliminated.

This maintenance of the spray dispensers at a substantially constant height above the ground, gives a uniform spray pattern, as is desired with many modern materials where the rate of application must be closely controlled for most effective results. Since the spray material is discharged into an effectively almost-fully-closed enclosure there is considerably reduced possibility of spray drift, and the small rate found is in any case virtually independent of wind conditions, so that spraying can be done under any conditions in which the air bags forming the skirt remain sufficiently stable despite their quite high "windage". In this respect it may be noted that when the wind has an appreciable "following" component the links 20 may be under compression, since the booms may be blown toward the tractor faster than they are being pulled.

Again owing to the physical characteristics of this new spray apparatus, and particularly the manner in which it is supported from the ground, it is possible to use relatively long booms, and apparatus of a total length of 200 feet (60 meters) is readily operable. Moreover, the apparatus can be moved over the crop at relatively higher speeds, since it does not create its own "windage" in its passage, remembering the very low wind speeds that are recommended for many modern materials. With the construction illustrated the skirt is readily removed for transportation and storage of the apparatus, and can easily be replaced in case of damage and/or wear.

In some embodiments of the invention only apertures 62 may be provided in the leading passage, while the trailing bag passage is pressurised but air is not allowed to pass from the trailing bag passage to the enclosure 52. This arrangement can give the required spraying but is more economical in the amount of pressurised air that is required.

Although the invention has been described as applied to an agricultural sprayer, it will be apparent to those skilled in the art that it is applicable to other spraying operations in which the close confinement of the spray material and/or removal of the need for outrigger supports running on the ground are desirable features.

I claim:

1. Spraying apparatus employing a skirt structure comprising:
   a sprayer boom frame,
   a bag skirt structure carried by the frame and when inflated extending downwards therefrom to have its smoothly contoured convex lowermost portion in close proximity to the ground,
   the bag skirt structure forming an enclosure which is open to the ground,
   means for injecting air under pressure into the bag skirt and into the skirt enclosure whereby the bag skirt is inflated and the boom and the skirt structure will be supported above the ground and can be moved over the ground,
   said air bag structure comprising at least one air bag, the inner wall or walls of which comprise respectively the corresponding inside parallel leading and trailing wall parts or leading and trailing walls of the enclosure, and into which air bag or bags the air is injected under pressure and from which air passes into the enclosure,
   the said air passing from the said bag skirt structure into the enclosure via aperture means in the air bag or bags inner wall parts or walls respectively,
   each such aperture means extending the full length of the respective air bag inner wall part or wall,
   wherein an aperture means in the leading inner wall part or leading inner wall is disposed close to the ground, while an aperture means in the training inner wall part or trailing inner wall is disposed closely adjacent to a roof of the enclosure, and dispensing means mounted by the boom frame to deliver spray material to the skirt enclosure.

2. Spraying apparatus as claimed in claim 1, wherein each said aperture means is constituted by a respective elongated slot in the wall part or wall, the parallel edges of which are connected by an elongated strip of mesh material through which the air flows.

3. Spraying apparatus as claimed in claim 1, wherein said means for injecting air comprises a fan in a fan housing connected to the bag skirt and the enclosure by a flexible tubular passage member through which air passes from the fan to the bag skirt and the enclosure, and including means for supporting the weight of the fan and the fan housing independently of the sprayer boom frame.

4. Spraying apparatus as claimed in claim 1, wherein the sprayer boom frame comprises at least two hingedly-connected boom portions, whereby each boom portion can be moved from an extended horizontal operative position to a folded storage position in which the boom portions extend approximately vertical and parallel to one another.

5. Spraying apparatus as claimed in claim 4, wherein the sprayer boom frame comprises two spaced parallel rods connected together along its length by cross-members, and the bag skirt structure is supported from the frame by means of loops of material fastened to the skirt and through which the rods are threaded.

6. Spraying apparatus as claimed in claim 5, wherein said sprayer boom frame includes arcuate downwardly-extending members engaging the exterior surfaces of the bag skirt structure for support thereof.

7. Spraying apparatus as claimed in claim 1, wherein the sprayer boom frame comprises two spaced parallel rods connected together along its length by cross-members, and the bag skirt structure is supported from the frame by means of loops of material fastened to the skirt and through which the rods are threaded.

8. Spraying apparatus employing a skirt structure comprising:

a sprayer boom frame, a bag skirt structure carried by the frame and when inflated extending downwards therefrom to have its smoothly contoured convex lowermost portion in close proximity to the ground, the bag skirt structure forming an enclosure which is open to the ground, means for injecting air under pressure into the bag skirt and into the skirt enclosure whereby the bag skirt is inflated and the boom and the skirt structure will be supported above the ground and can be moved over the ground, said means for injecting air comprising a fan in a fan housing connected to the bag skirt and the enclosure by a flexible tubular passage member through which air passes from the fan to the bag skirt and the enclosure, means for supporting the weight of the fan and the fan housing independently of the sprayer boom frame, and dispensing means mounted by the boom frame to deliver spray material to the skirt enclosure.

9. Spraying apparatus as claimed in claim 8, wherein the said fan in the fan housing is supported above the sprayer boom, frame and is connected to the bag skirt and the enclosure by a downwardly-extending tubular passage member.

10. Spraying apparatus as claimed in claim 8, wherein the said bag skirt structure comprises at least one air bag, the inner wall or walls of which comprise respectively the corresponding inside parallel leading and trailing wall parts or leading and trailing walls of the enclosure, and into which air bag or bags the air is injected under pressure and from which air passes into the enclosure.

11. Spraying apparatus as claimed in claim 10, wherein the air passes from the said bag skirt structure into the enclosure via aperture means in the air bag or bags inner wall parts or walls respectively, each such aperture means extending the full length of the respective air bag inner wall part or wall.

12. Spraying apparatus employing a skirt structure comprising:

a sprayer boom frame, a bag skirt structure carried by the frame and when inflated extending downwards therefrom to have its smoothly contoured convex lowermost portion in close proximity to the ground, the bag skirt structure forming an enclosure which is open to the ground, means for injecting air under pressure into the bag skirt and into the skirt enclosure whereby the bag skirt is inflated and the boom and the skirt structure will be supported above the ground and can be moved over the ground, and dispensing means mounted by the boom frame to deliver spray material to the skirt interior, wherein the sprayer boom frame comprises at least two hingedly-connected boom portions, whereby each boom portion can be moved from an extended horizontal operative position to a folded storage position in which the boom portions extend approximately vertical and parallel to one another.

13. Spraying apparatus as claimed in claim 12, wherein the sprayer boom frame comprises two spaced parallel rods connected together along its length by cross-members, and the bag skirt structure is supported from the frame by means of loops of material fastened to the skirt and through which the rods are threaded.

14. Spraying apparatus as claimed in claim 13, wherein said sprayer boom frame includes arcuate downwardly-extending members engaging the exterior surfaces of the bag skirt structure for support thereof.

15. Spraying apparatus employing a skirt structure comprising:

a sprayer boom frame, a bag skirt structure carried by the frame and when inflated extending downwards therefrom to have its smoothly contoured convex lowermost portion in close proximity to the ground, the bag skirt structure forming an enclosure which is open to the ground, means for injecting air under pressure into the bag skirt and into the skirt enclosure whereby the bag skirt is inflated and the boom and the skirt structure will be supported above the ground and can be moved over the ground, dispensing means mounted by the boom frame to deliver spray material to the skirt interior, and wherein the sprayer boom frame comprises two spaced parallel rods connected together along its length by cross-members, and the bag skirt structure is supported by the frame by means of loops of material fastened to the skirt and through which the rods are threaded.

* * * * *